United States Patent [19]

Nakajima et al.

[11] Patent Number: 5,599,250
[45] Date of Patent: Feb. 4, 1997

[54] TORQUE DISTRIBUTION TYPE DIFFERENTIAL GEAR SYSTEM

[75] Inventors: Shinichiro Nakajima; Hideyuki Sato, both of Saitama, Japan; Makoto Nishiji; Paolo Sachettini, both of La Louviere, Belgium

[73] Assignee: Zexel Corporation, Tokyo, Japan

[21] Appl. No.: 404,633

[22] Filed: Mar. 15, 1995

[30] Foreign Application Priority Data

| Apr. 6, 1994 | [JP] | Japan | 6-90698 |
| Jan. 23, 1995 | [JP] | Japan | 7-27401 |

[51] Int. Cl.$^6$ .................................................. F16H 48/06
[52] U.S. Cl. ........................ 475/249; 475/248; 475/252
[58] Field of Search .................................. 475/248, 249, 475/252, 253; 74/665 F, 665 G, 665 GA

[56] References Cited

U.S. PATENT DOCUMENTS

| 4,781,078 | 11/1988 | Blessing et al. | 475/249 X |
| 5,362,284 | 11/1994 | Brewer | 475/249 |
| 5,415,599 | 5/1995 | Cilano | 475/252 |
| 5,433,673 | 7/1995 | Cilano | 475/252 |
| 5,443,431 | 8/1995 | Cilano | 475/249 |
| 5,458,546 | 10/1995 | Teraoka | 475/248 |
| 5,464,084 | 11/1995 | Aoki et al. | 475/249 |

FOREIGN PATENT DOCUMENTS

| 0356401 | 2/1990 | European Pat. Off. | F16H 1/45 |
| 3927071A1 | 3/1990 | Germany. | |
| 61-123250 | 8/1986 | Japan. | |
| 63-38586 | 8/1988 | Japan. | |
| 1-303339 | 12/1989 | Japan. | |

*Primary Examiner*—Charles A. Marmor
*Assistant Examiner*—Peter Kwon

[57] ABSTRACT

In a differential gear system disclosed, a pair of sun gears and a plurality of pairs of planetary gears are received in a housing. The pair of sun gears are coaxial with a rotational axis of the housing. End portions of a pair of drive shafts extending through a pair of end walls of the housing are spline-engaged respectively with the pair of sun gears. The pair of sun gears have helical teeth, respectively. Each pair of intermeshing planetary gears are meshed respectively with the helical teeth of the pair of sun gears, respectively. A plurality of washers are interposed between the pair of sun gears. The plurality of washers have first washers and second washers, respectively, which first and second washers are alternately arranged. The first washers are engaged with end portions of reduced diameters of the sun gears such that the first washers are capable of moving axially but incapable of rotation. The second washers are engaged with the housing such that the second washers are capable of moving axially but incapable of rotation.

7 Claims, 5 Drawing Sheets

TORQUE DISTRIBUTION TYPE DIFFERENTIAL GEAR SYSTEM

BACKGROUND OF THE INVENTION

This invention relates to a torque distribution type differential gear system capable of distributing input torque to a pair of drive shafts at a different magnitude.

Conventional differential gear systems of this type include a housing which is rotationally driven, and a gear train disposed within the housing. This gear train includes a pair of sun gears rotatably received within the housing with its axis in alignment with a rotational axis of the housing, and at least one pair of intermeshing planetary gears which are also engaged respectively with the sun gears. When a torque is supplied to the housing, the torque is transmitted to the respective sun gears through the planetary gears. The torque transmitted to the pair of sun gears are, in turn, transmitted respectively to a pair of drive shafts such as, for example, axles of vehicles.

As the sun gears and the planetary gears to be meshed with the sun gears, there are employed gears having helical teeth such as worm gears or helical gears. Therefore, in the event that a torque is transmitted between the planetary gears and the sun gears, an axial force is produced in the sun gears, thereby the sun gears are urged against the housing or brought closer to each other. As a consequence, when the sun gears are rotated relative to the housing (at the time of differential rotation), frictional resistance is produced between the sun gears and the housing. The input torque is distributed to the pair of sun gears and then to the pair of drive shafts at a different magnitude, depending on degree of this frictional resistance.

It is preferred that the ratio of magnitude of the torque (hereinafter referred to as the "torque bias ratio") to be distributed to the respective sun gears can be properly changed, depending on vehicles in which the differential gear system is used. Thus, in the conventional planetary gear system, as disclosed in German Patent DE 3927071, a single or a plurality of washers are interposed, for example, between sun gears and end walls of a housing, or between a pair of sun gears, so that a desired torque bias ratio is obtained by properly changing various kinds of washers having different frictional coefficients, depending on vehicles.

In the above-mentioned differential gear system, a requirement for a larger torque bias ratio could not be met sufficiently. In order to realize a larger torque bias ratio, there can be contemplated that washers having a large frictional coefficient are used, or washers having an enlarged diameter are used, so that the frictional resistance can be increased.

However, if the former method is employed, frictional resistance per unit area is overly increased between the washers and the sun gears or the housing which is directly in contact with the washers, with the result that hot-seize is likely to occur therebetween. On the other hand, if the latter method is employed, since the diameter of the housing must be increased as the diameter of each washer is increased, the system inevitably becomes large in size.

One approach for solving the above problem is disclosed in Japanese Laid-Open Application No. Hei 1-303339 and Japanese Utility Model Laid-Open Application No. Sho 61-123250. Specifically, a plurality of first washers are unrotatably and axially movably provided on an outer periphery of each drive shaft, and a plurality of second washers are likewise unrotatably and axially movably provided on end walls of a housing. The first and second washers are alternately arranged. As a consequence, frictional interfaces are formed respectively between the end wall of the housing and the first washers, between end faces of the sun gears and the second washers, and between the first washers and the second washers. In this way, the torque bias ratio can be increased by increasing the total area of the frictional interfaces and without increasing the system in size.

However, since the first washers are in engagement with the drive shafts in the differential gear system of the above Laid-Open applications, the differential gear system must be assembled together with the drive shafts and therefore, the assembling is troublesome.

As another example of the prior art, there is a differential gear system disclosed in Japanese Patent Publication No. Sho 63-38586, in which each sun gear has a reduced-diameter sleeve-like portion at its one end. A plurality of first washers are disposed on an outer periphery of the sleeve-like portion such that the first washers are capable of moving axially but incapable of rotation. Similarly, a plurality of second washers are disposed on an inner periphery of a receiving recess formed in an end wall of a housing such that the second washers are capable of moving axially but incapable of rotation. The first and second washers are alternately arranged. Although this system has many frictional interfaces, both sun gears and planetary gears are formed of bevel gears, respectively and a spring is required to be interposed between the sun gears because no axial force can be produced between the sun gears depending on the mode of engagement between the sun gears and the planetary gears. Therefore, this system is different in its basic construction from the differential gear system according to the present invention.

SUMMARY OF THE INVENTION

It is, therefore, an object of the present invention to provide a differential gear system in which the torque bias ratio can be increased without making the system large in size.

According to the present invention, there is provided a distribution type differential gear system, comprising:

(a) a housing which is rotated about a rotational axis upon receipt of torque, the housing including a sleeve portion coaxial with the rotational axis and a pair of end walls formed on opposite ends of the sleeve portion and mutually spaced away in a direction of the rotational axis;

(b) a pair of generally sleeve-like sun gears received in the housing in such a manner as to be coaxial with the rotational axis, one end portions of a pair of drive shafts extending respectively through the pair of end walls of the housing being inserted in and spline-connected to the pair of sun gears, respectively, each of the pair of sun gears having helical teeth, at least one of the pair of sun gears having a support portion of a reduced diameter, formed on one end portion thereof opposing the other sun gear, and projecting in a direction of the rotational axis, the at least one sun gear further having an annular step formed between the support portion and a remaining portion of the at least one sun gear;

(c) a pair of intermeshing planetary gears received within the housing and meshing with the pair of sun gears, respectively; and (d) a plurality of washers arranged between the pair of sun gears;

(e) the plurality of washers including at least one first washer and at least one second washer, the first washer being in engagement with an outer periphery of the support portion of the at least one sun gear such that the first washer is capable of moving axially but incapable of rotation, the second washer being in engagement with the housing such that the second washer is capable of moving axially but incapable of rotation.

Also, there is provided a distribution type differential gear system, comprising:

(a) a housing which is rotated about a rotational axis upon receipt of torque, the housing including a sleeve portion coaxial with the rotational axis and a pair of end walls formed on opposite ends of the sleeve portion and mutually spaced away in a direction of the rotational axis, at least one of the end walls being formed with a receiving recess;

(b) a pair of generally sleeve-like sun gears received in the housing in such a manner as to be coaxial with the rotational axis, one end portions of a pair of drive shafts extending respectively through the pair of end walls of the housing being inserted in and spline-connected to the pair of sun gears, respectively, each of the pair of sun gears having helical teeth, at least one of the pair of sun gears having a support portion of a reduced diameter, formed on one end portion thereof opposing the at least one end wall of the housing, and projecting in a direction of the rotational axis, the at least one sun gear further having an annular step formed between the support portion and a remaining portion of the at least one sun gear, the support portion being inserted in the receiving recess of the housing;

(c) a pair of intermeshing planetary gears received within the housing and meshing with the pair of sun gears, respectively; and (d) a plurality of washers arranged between the step of the at least one sun gear and a bottom surface of the receiving recess formed in the end wall of the housing;

(e) the plurality of washers including at least one first washer and at least one second washer, the first washer being in engagement with an outer periphery of the support portion of the at least one sun gear such that the first washer is capable of moving axially but incapable of rotation, the second washer being in engagement with an inner periphery of the receiving recess of the housing such that the second washer is capable of moving axially but incapable of rotation, the second washer being interposed between the first washer and the step of said sun gear.

DETAILED DESCRIPTION OF THE EMBODIMENT

The first embodiment of the present invention will now be described with reference to FIGS. 1 to 5.

Figure 1:
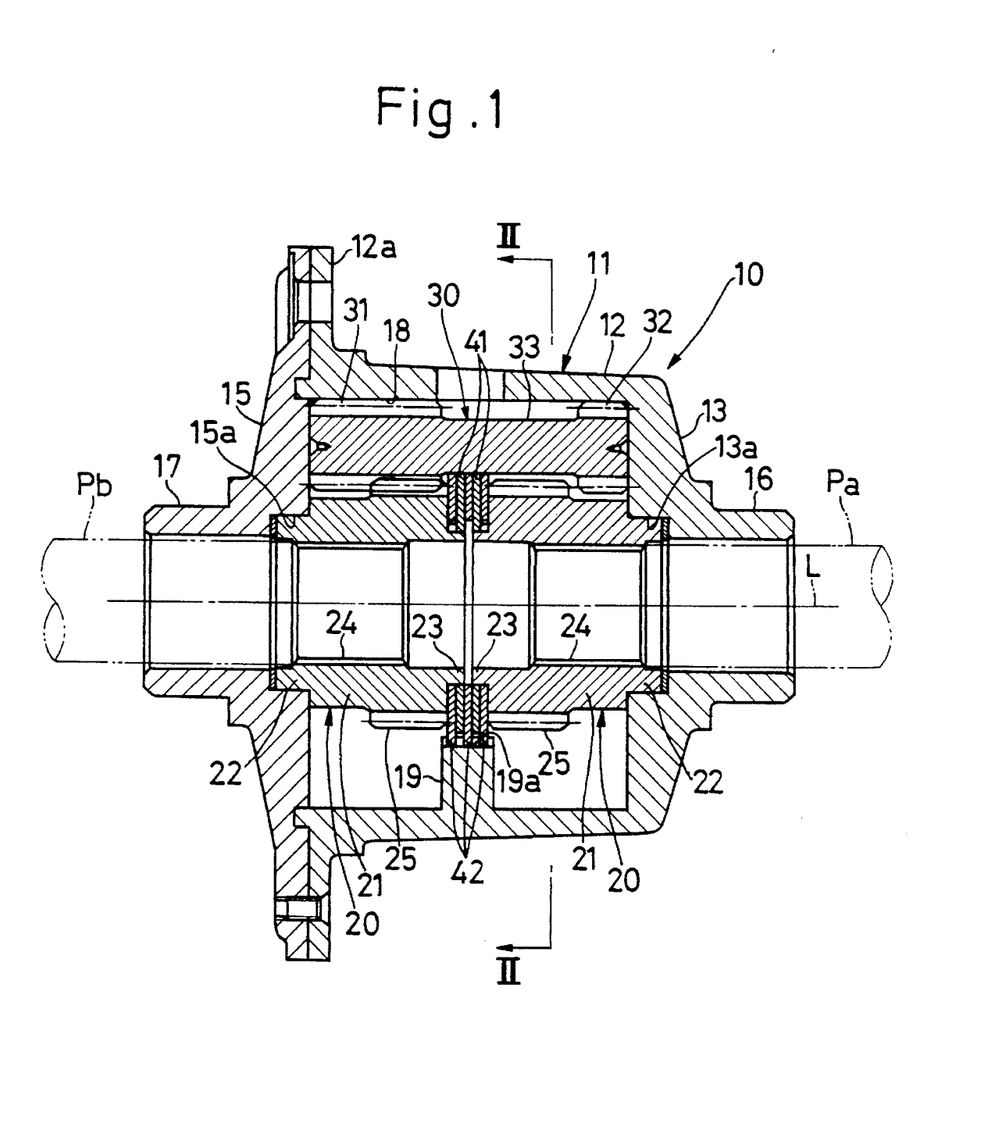
FIG. 1 is a vertical sectional view showing a differential gear system according to a first embodiment of the present invention.
Figure 2:
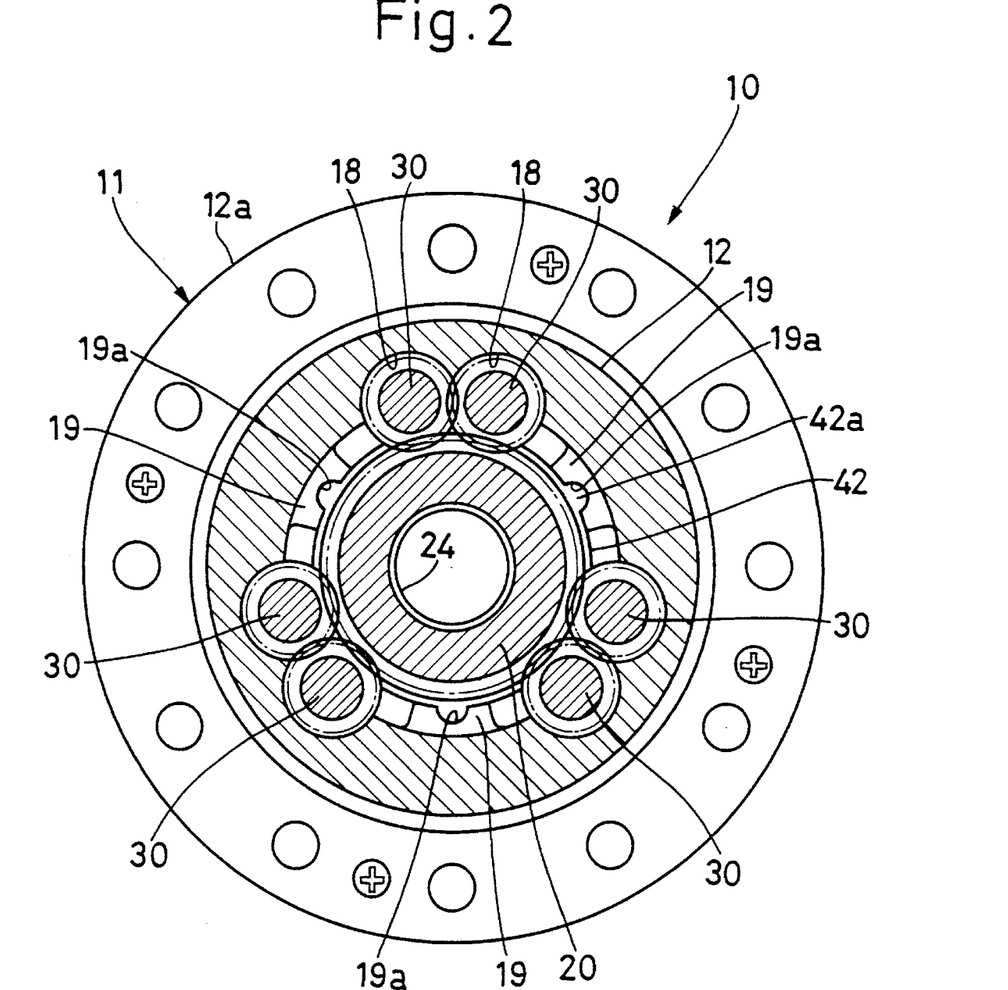
FIG. 2 is a sectional view taken on line II—II of FIG. 1.

As shown in FIGS. 1 and 2, a differential gear system includes a housing 10 which is rotationally driven about a rotational axis L. The housing 10 comprises a housing body 11 and a disk-like closure (or lid) member 15. The housing body 11 includes a sleeve portion 12 coaxial with the rotational axis L and an end wall 13 adapted to close one end of the sleeve portion 12. The closure member 15 is provided as a wall on the other end (i.e., the other end wall) of the housing 10 and secured to an annular flange portion 12a which is formed on the other end of the sleeve portion 12. The end wall 13 and the closure member 15 are provided respectively with journals 16 and 17 extending axially outwardly from their central portions, respectively. The journals 16 and 17 are coaxial with the rotational axis L.

A pair of sun gears 20 are received within the housing 10. The sun gears 20 are coaxial with the rotational axis L of the housing 10. Each sun gear 20 includes a sleeve-like body portion 21 and a sleeve portion 22 (support portion) formed on one end of the body portion 21 and having a smaller outer diameter than that of the body portion 21, and another sleeve portion 23 (support portion) formed on the other end of the body portion 21 and having a smaller outer diameter than that of the body portion 21. The sleeve portion 22 of one of the sun gears 20 is received in a circular receiving recess 13a formed in the end wall 13 of the housing 10. The sleeve portion 22 of the other sun gear 20 is received in a circular receiving recess 15a formed in an inner surface of the closure member 15. Each sun gear 20 has a spline 24 formed in an inner peripheral surface thereof, and helical teeth 25 formed on an outer peripheral surface thereof. The helical teeth 25 of one of the sun gears 20 are twisted in an opposite direction to the twisting direction of the helical teeth 25 of the other sun gear 20.

A drive shaft Pa is inserted into the Journal 16 with its end portion spline-connected to one of the sun gears 20. Another drive shaft Pb is inserted into the journal 17 with its end portion spline-connected to the other sun gear 20.

Three pairs of receiving recesses 18 are circumferentially equally-spacedly formed in an inner peripheral surface of the sleeve portion 12 of the housing 10. Each receiving recess 18 has a generally semi-circular configuration in section and extends in parallel relation with the rotational axis L over the entire length of the housing body 11. Each receiving recess 18 forming one pair is communicated with its counterpart receiving recess 18.

A pair of planetary gears 30 each having an axis parallel to the rotational axis L are rotatably received in each pair of receiving recesses 18, respectively. Each planetary gear 30 has long helical teeth 31 formed on an outer peripheral surface at one end portion thereof, short helical teeth 32 formed on the other end portion thereof, and a reduced-diameter release portion 33 (portion where no helical teeth are formed) which is formed between the long helical portion 31 and the short helical teeth 32. The helical teeth 31 and 32 of the planetary gear 30 are formed in a mutually identical configuration except that their lengths are different. One gear of each planetary gear pair 30 is reversed in position of its helical teeth 31 and 32, and also in twisting direction of its helical teeth 31 and 32 with respect to its counterpart gear.

The long helical teeth 31 of one of the planetary gear pair 30 are meshed with the sun gear 20 on the side of the closure member 15, while the long helical teeth 31 of the other planetary gear 30 are meshed with the sun gear 20 on the side of the end wall 13. Also, the long helical teeth 31 of one of the planetary gear pair 30 are meshed with the short helical teeth 32 of the other planetary gear 30, while the short helical teeth 32 of one of the planetary gear pair 30 are meshed with the long helical teeth 31 of the other planetary gear 30. As a consequence, the pair of sun gears 20 are connected to each other through the three pairs of planetary gears 30. The torque exerted to the housing 10 is transmitted to the sun gears 20 through the planetary gears 30 and then to the drive shafts Pa and Pb.

Figure 3:
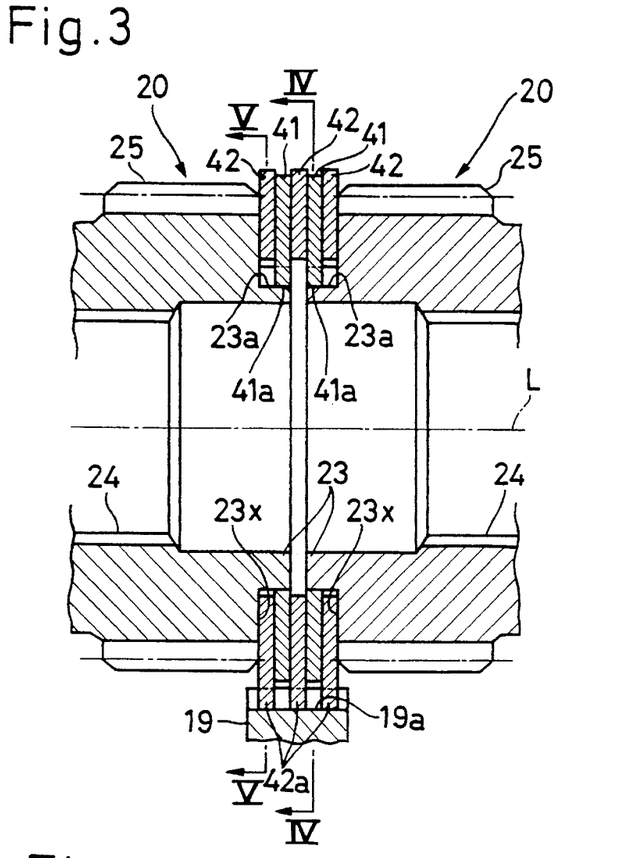
FIG. 3 is a sectional view showing an important portion of FIG. 1 but on its enlarged scale.

The characteristic part of the present invention will be described next. As best shown in FIG. 3, an annular step 23x is formed at a boundary area between the sleeve portion 23 of each sun gear 20 and its remaining portion. Five annular washers in total are interposed between the steps 23x of the pair of sun gears 20. Those five washers comprise two first washers 41 and three second washers 42. The first washers 41 and the second washers 42 are alternately arranged. That is to say, the two second washers 42 are arranged such that they contact the steps 23x of the pair of sun gears 20, while the remaining second washer 42 is arranged at the center of a space formed between the steps 23x of the sun gears 20. Each first washer 41 is disposed between the two second washers 42.

Figure 4:
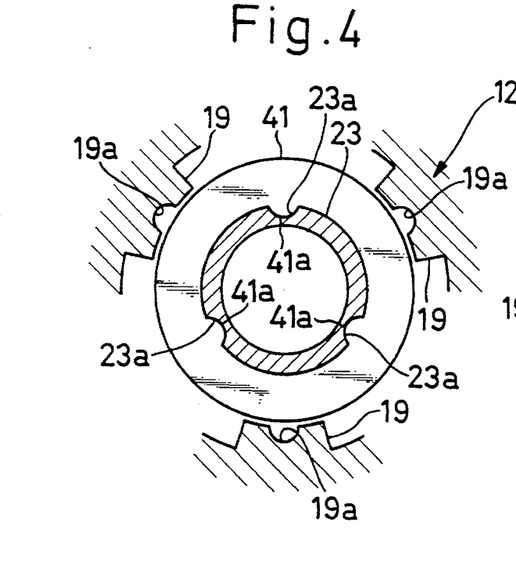
FIG. 4 is a sectional view taken on line IV—IV of FIG. 3.

The first washers 41 are in engagement with an outer periphery of the sleeve portion 23 of each sun gear 20 such that the first washers 41 are capable of moving axially but incapable of rotation. This engagement construction will be described in detail. As best shown in FIG. 4, axially extending three grooves 23a are circumferentially equally-spacedly formed in the outer periphery of the sleeve portion 23 of each sun gear 20. On the other hand, as shown in FIG. 4, radially inwardly projecting three projections 41a are circumferentially equally-spacedly formed in an inner peripheral edge of each first washer 41. Those projections 41a are fitted in the grooves 23a, respectively. Since the first washers 41 are incapable of rotation relative to the sun gears 20, they are rotated together with the sun gears 20. It should be noted that the first washers 41 are capable of rotation relative to the housing 10.

Figure 5:
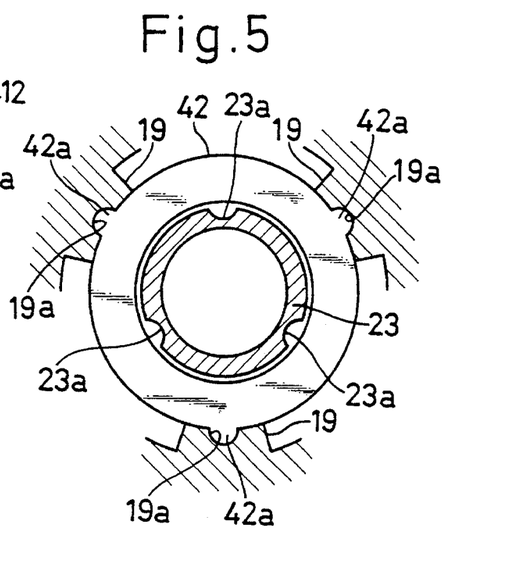
FIG. 5 is a sectional view taken on line V—V of FIG. 3.

The second washers 42 are in engagement with an inner periphery of the sleeve portion 12 of the housing 20 such that the washers 42 are axially movable but incapable of rotation. This engagement construction will be described in detail. As best shown in FIG. 5, three protrusions 19 are circumferentially equally-spacedly formed in an inner periphery of an axially central portion of the sleeve portion 12 of the housing 10. Each protrusion 19 is disposed between adjacent two pairs of planetary gears 30. An inner peripheral surface of each protrusion 19 extends along an imaginary cylindrical surface about the rotational axis L. A groove 19a extending in parallel with the rotational axis L is formed in the inner peripheral surface of the protrusion 19. On the other hand, each second washer 42 is provided with radially outwardly projecting three projections 42a which are circumferentially equally-spacedly formed in an outer peripheral edge thereof. Those projections 42a are fitted in the grooves 19a, respectively. Since the second washers 42 are incapable of rotation relative to the housing 10, they are rotated together with the housing 10. It should be noted that the second washers 42 are capable of rotation relative to the sun gears 20.

In the differential gear system thus construction, when a torque is input into the housing 10, the torque is transmitted to the drive shafts Pa and Pb via the three pairs of planetary gears 30 and one pair of sun gears 20. Due to intermeshing between the helical teeth 25 of the sun gears 20 and the helical teeth 31 of the planetary gears 30, an axial force is exerted to each sun gear 20. Owing to this axial force, the first washers 41 and the second washers 42 are contacted under pressure with each other, and the second washers 42 and the steps 23x of the sun gears 20 are contacted under pressure with each other.

When the differential gear system is in its differentiating mode, the housing 10 and the pair of sun gears 20 are rotated relative to each other. Consequently, frictional force is produced between the first washers 41 and the second washers 42 and between the second washers 42 and the steps 23x of the sun gears 20, and differentiation is limited by this frictional force, thus enabling to change the torque bias ratio between the drive shafts Pa and Pb.

The two first washers 41 are rotated together with corresponding sun gears 20, respectively, while the three second washers 42 are rotated together with the housing 10. As a result, there can be obtained six frictional interfaces. More specifically, two frictional interfaces can be obtained by one pair of second washers 42 and the steps 23x of the sun gears 20 which are in contact with the second washers 23. Similarly, four frictional interfaces can be obtained by two first washers 41 and the three second washers 42 which are in connection with the two first washers 41. In this way, the total area of the frictional interfaces can be extensively increased and thus, the torque bias ratio can be greatly increased. Further, in order to increase the total area of the frictional interfaces, it is not necessary to individually increase the areas of the washers and thus, a large-sized housing 10 can be avoided.

It should be noted that even if a plurality of washers, which are not restricted in rotation, are interposed between the sun gears in the manner as experienced in the prior art, frictional interface which can be obtained is only one. The reason is that among the washers and sun gears, it is only adjacent one pair of members (frictional resistance between those adjacent one pair of members is smaller than the frictional resistance between other members which, in combination, form one pair) which are actually relatively rotated.

Next, other embodiments of the present invention will be described. In the embodiments to be described next, those component parts corresponding to those of the preceding embodiment are denoted by identical reference numerals, respectively, and detailed description thereof is omitted.

Figure 6:
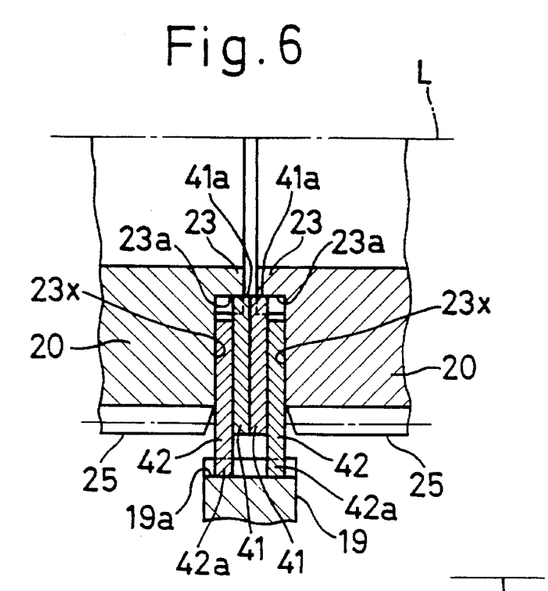
FIGS. 6 to 8 respectively illustrate second to fourth embodiments of the present invention, in each one of which an important portion of a support structure of washers disposed between a pair of sun gears is shown on its enlarged scale.

In the second embodiment shown in FIG. 6, two first washers 41 and two second washers 42 are used. The first washers 41 are located away from the steps 23x of the intermeshing sun gears 20, and the second washers 42 are interposed therebetween as in the first embodiment. What is different from the first embodiment is only that the two first washers 41 are directly contacted to each other instead of being contacted through the second washers 42. Since those two first washers 41 are rotated together with different sun gears 20, respectively, there can be positively obtained a single frictional interface between the first washers 41 when in a differentiating mode. Therefore, in this second embodiment, there can be obtained five frictional interfaces. In FIG. 6, the grooves 23a of the sun gears 20 and the grooves 19a of the housing protrusions 19 are circumferentially in alignment with each other only for the sake of simplicity of the drawing. The same is true to FIGS. 7 and 8.

Figure 7:
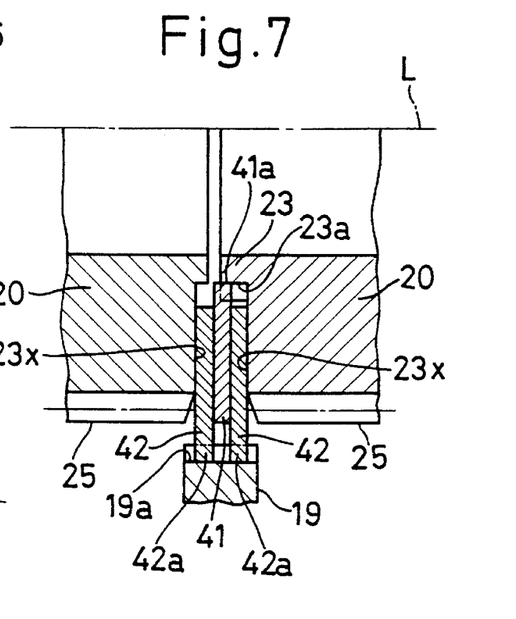

In the third embodiment shown in FIG. 7, a single first washer 41 and two second washers 42 are used. Only one of the sun gears 20 is formed with a sleeve portion 23 having grooves 23a. The first washer 41 is unrotatably retained in these grooves 23a. One of the second washers 42 is, as in the case with the above-mentioned two embodiments, interposed between the first washer 41 and the step 23x of one of the sun gears 20, while the other second washer 42 is interposed between the first washer 41 and an end face of the other sun gear 20. In this third embodiment, there can be obtained four frictional interfaces by those three washers 41 and 42.

Figure 8:
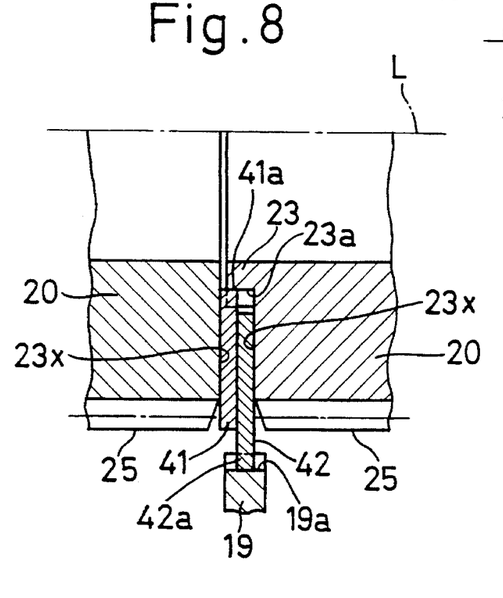

In the fourth embodiment shown in FIG. 8, a single first washer 41 and a single second washer 42 are used. As in the case with the third embodiment, only one of the sun gears 20 is formed with a sleeve portion 23 having grooves 23a. The first washer 41 is unrotatably retained in these grooves 23a. The second washer 42 is interposed between the first washer 41 and a step 23x of one of the sun gears 20, while the first washer 41 is interposed between an end face of the other sun gear 20 and the second washer 42. In this fourth embodiment, there can be obtained three frictional interfaces.

In the above-mentioned first to fourth embodiments, an auxiliary washer may be interposed between each of a pair of sun gears and its adjacent second washer, or between adjacent first and second washers in order to adjust frictional resistance. This auxiliary washer may be rotatable relative to both the sun gear and the housing or may be unrotatable relative to one of the sun gear and the housing. Also, the second washer may be indirectly engaged with the housing through another intermediate member.

Figure 9:
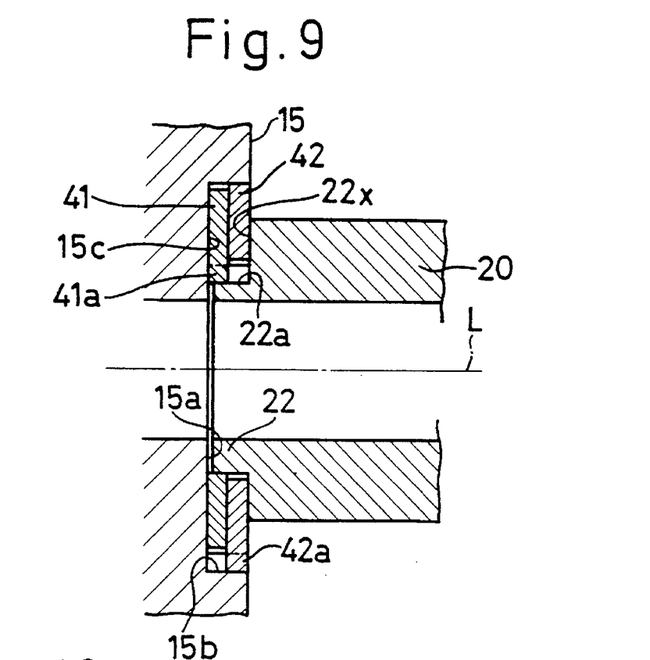
FIGS. 9 to 11 respectively illustrate fifth to seventh embodiments of the present invention, in each one of which an important portion of a support structure of washers disposed between a sun gear and an end wall of the housing on its enlarged scale.

In the fifth embodiment shown in FIG. 9, a sleeve portion 22 of a sun gear 20 is received in a receiving recess 15a formed in a closure member 15 of the housing 10 with a space formed radially therebetween. The sun gear 20 is formed with an annular step 22x at its boundary area between the sleeve portion 22 of the sun gear 20 and the remaining part thereof. A single first washer 41 and a single second washer 42 are interposed between the step 22x and the receiving recess 15a. The sleeve portion 22 of the sun gear 20 is provided with axially extending grooves 22a circumferentially equally-spacedly formed therein. By fitting projections 41a of the first washer 41 in these grooves 22a, the first washer 41 is axially movably and unrotatably engaged with the sun gear 20. On the other hand, an inner peripheral surface of the receiving recess 15a of the closure member 15 is provided with axially extending grooves 15b circumferentially equally-spacedly formed therein. By fitting projections 42a of the second washer 42 in these grooves 15b, the second washer 42 is axially movably and unrotatably engaged with the housing 10. The first washer 41 is away from the step 22x of the sun gear 20 and in contact with a bottom surface 15c of the receiving recess 15a. The second washer 42 is interposed between the first washer 41 and the step 22x. In this embodiment, there can be obtained three frictional interfaces by the two washers 41 and 42.

Figure 10:
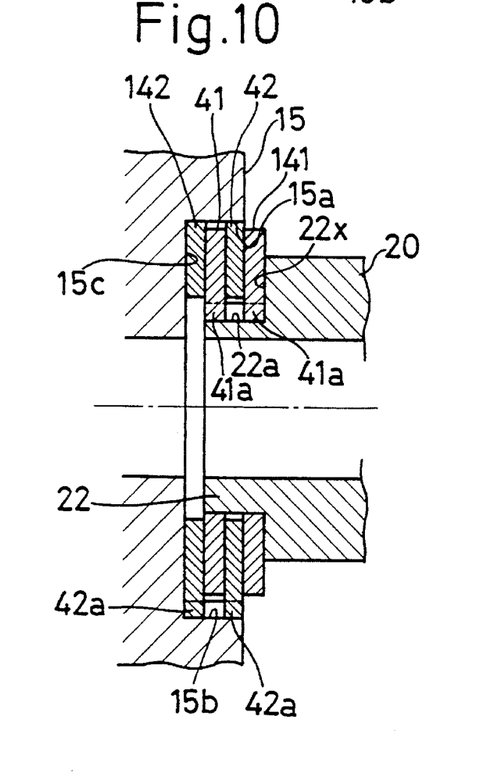

In the sixth embodiment shown in FIG. 10, a friction adjusting first auxiliary washer 141 having an identical configuration to that of the first washer 41 is interposed between a second washer 42 and a step 22x of a sun gear 20. Similarly, a friction adjusting second auxiliary washer 142 having an identical configuration to that of the second washer 42 is interposed between the first washer 41 and a bottom surface 15c of a receiving recess 15a. In this sixth embodiment, there can be obtained three frictional interfaces as in the case with the fifth embodiment.

Figure 11:
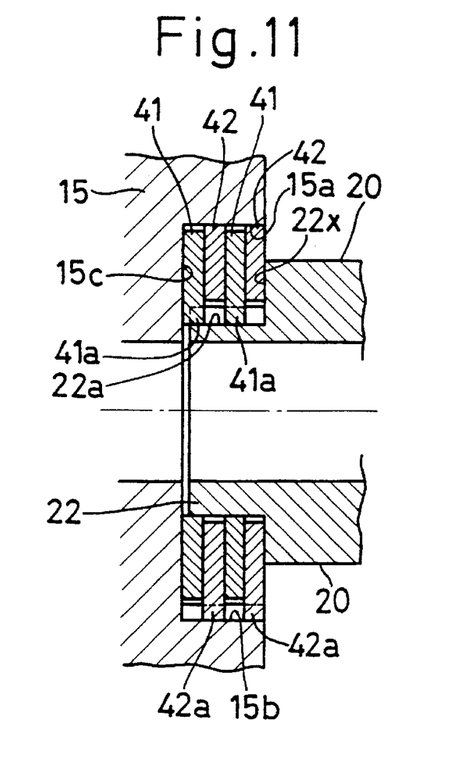

In the seventh embodiment shown in FIG. 11, a second washer 42, a first washer 41, a second washer 42 and a first washer 41 are arranged in this order from a step 22x of a sun gear 20 to a bottom surface 15c of a receiving recess 15a. In this seventh embodiment, there can be obtained five interfaces by the four washers.

In the alternative, one of the washer arrangements shown in the embodiments of FIGS. 9 to 11 may, of course, be interposed between an end wall 13 (see FIG. 1) and a corresponding sun gear 20.

The present invention may likewise be applied to a differential gear system in which the axis of the sun gears and the axis of the planetary gears are in skewed relation.

What is claimed is:

1. A distribution type differential gear system, comprising:
    (a) a housing rotated about a rotational axis upon receipt of torque, said housing includes a sleeve portion coaxial with said rotational axis, and a pair of end walls formed on opposite ends of said sleeve portion and mutually spaced away in a direction of said rotational axis;
    (b) a pair of generally sleeve-like sun gears received in said housing, wherein the pair of sun gears is coaxial with said rotational axis, one end portion of a pair of drive shafts extends through said pair of end walls of said housing and is inserted in and spline-connected to said pair of sun gears, respectively, each of said pair of sun gears contains helical teeth, at least one of said pair of sun gears further contains a support portion of a reduced diameter formed on one end portion thereof opposing the other sun gear, and projecting in a direction of said rotational axis, said at least one sun gear further contains an annular step formed between said support portion and a remaining portion of said at least one sun gear;
    (c) a pair of intermeshing planetary gears received within said housing, wherein the pair of planetary gears are meshed with said pair of sun gears, respectively; and
    (d) a plurality of washers arranged between said pair of sun gears, wherein said plurality of washers include at least one first washer and at least one second washer, said first washer being engaged with an outer periphery of said support portion of said at least one sun gear, whereby said first washer is capable of moving axially but incapable of rotation relative to said at least one sun gear, said second washer being engaged with said housing, whereby said second washer is capable of moving axially but incapable of rotation relative to said housing, the second washer is further disposed between the first washer and the step of said sun gear.

2. The differential gear system according to claim 1, wherein an additional said second washer is interposed between said first washer and an end face of said other sun gear.

3. A distribution type differential gear system, comprising:
    (a) a housing rotated about a rotational axis upon receipt of torque, the housing includes a sleeve portion coaxial with the rotational axis, and a pair of end walls formed on opposite ends of the sleeve portion and mutually spaced away in a direction of the rotational axis;

(b) a pair of generally sleeve-like sun gears received in the housing, wherein the pair of sun gears is coaxial with the rotational axis., one end portion of a pair of drive shafts extends through the pair of end walls of the housing and is inserted in and spline-connected to the pair of sun gears, respectively, each of said pair of sun gears contains helical teeth, at least one of said pair of sun gears further contains a support portion of a reduced diameter formed on one end portion thereof opposing the other sun gear, and projecting in a direction of the rotational axis, said at least one sun gear further contains an annular step formed between the support portion and a remaining portion of said at least one sun gear;

(c) a pair of intermeshing planetary gears received within the housing, wherein the pair of planetary gears are meshed with the pair of sun gears, respectively (d) a plurality of washers arranged between said pair of sun gears, wherein the plurality of washers include at least one first washer and at least one second washer, the first washer being engaged with an outer periphery of the support portion of said at least one sun gear, whereby the first washer is capable of moving axially but incapable of rotation relative to said at least one sun gear, the second washer being engaged with the housing, whereby the second washer is capable of moving axially but incapable of rotation relative to said housing; and (e) said support portions and steps are formed on opposing end portions of said pair of sun gears, and which comprises a pair of said first washers and a pair of said second washers, said pair of first washers being engaged respectively with said support portions of said pair of sun gears, one of said pair of second washers is interposed between one of said pair of first washers and said step of said sun gears, while the other second washer is interposed between the other first washer and said step of the other of said sun gears.

4. The differential gear system according to claim 3, wherein an additional said second washer is interposed between said pair of first washers.

5. A distribution type differential gear system, comprising:

(a) a housing rotated about a rotational axis upon receipt of torque, the housing includes a sleeve portion coaxial with the rotational axis, and a pair of end walls formed on opposite ends of the sleeve portion and mutually spaced away in a direction of the rotational axis;

(b) a pair of generally sleeve-like sun gears received in the housing, wherein the pair of sun gears is coaxial with the rotational axis, one end portion of a pair of drive shafts extends through the pair of end walls of the housing and is inserted in and spline-connected to the pair of sun gears, respectively, each of said pair of sun gears contains helical teeth, at least one of said pair of sun gears further contains a support portion of a reduced diameter formed on one end portion thereof opposing the other sun gear, and projecting in a direction of the rotational axis, said at least one sun gear further contains an annular step formed between the support portion and a remaining portion of said at least one sun gear;

(c) a pair of intermeshing planetary gears received within the housing, wherein the pair of planetary gears are meshed with the pair of sun gears, respectively (d) a plurality of washers arranged between the pair of sun gears, wherein the plurality of washers include at least one first washer and at least one second washer, the first washer being engaged with an outer periphery of the support portion of said at least one sun gear, whereby the first washer is capable of moving axially but incapable of rotation relative to said at least one sun gear, the second washer being engaged with the housing, whereby the second washer is capable of moving axially but incapable of rotation relative to said housing; and (e) said at least one sun gear is provided with a groove formed in the outer periphery of said support portion thereof, wherein said at least one sun gear extends in parallel relation with said rotational axis, said first washer is provided with a projection formed on an inner peripheral edge thereof and allowed to engage in said groove, a protrusion being formed on an inner periphery of said sleeve portion of said housing, a groove being formed in an inner surface of said protrusion facing said rotational axis in such a manner as to extend in parallel relation with said rotational axis, a projection being formed on an outer peripheral edge of said second washer in such a manner as to be able to engage in said groove of said protrusion.

6. The differential gear system according to claim 5, wherein three pairs of said planetary gears are arranged in parallel relation with said rotational axis, and three of said protrusions are arranged between said pairs of planetary gears.

7. A distribution type differential gear system, comprising:

(a) a housing rotated about a rotational axis upon receipt of torque, said housing includes a sleeve portion coaxial with said rotational axis, a pair of end walls formed on opposite ends of said sleeve portion and mutually spaced away in a direction of said rotational axis, where at least one of said end walls is formed with a receiving recess;

(b) a pair of generally sleeve-like sun gears received in said housing, wherein the pair of sun gears is coaxial with said rotational axis, one end portion of a pair of drive shafts extends through said pair of end walls of said housing and is inserted in and spline-connected to said pair of sun gears, respectively, each of said pair of sun gears contains helical teeth, at least one of said pair of sun gears further contains a support portion of a reduced diameter formed on one end portion thereof opposing said at least one end wall of said housing, and projecting in a direction of said rotational axis, said at least one sun gear further contains an annular step formed between said support portion and a remaining portion of said at least one sun gear, whereby said support portion is inserted in said receiving recess of said housing;

(c) a pair of intermeshing planetary gears received within said housing, wherein the pair of planetary gears are meshed with said pair of sun gears, respectively; and (d) a plurality of washers arranged between said step of said at least one sun gear and a bottom surface of said receiving recess formed in said end wall of said housings wherein said plurality of washers include at least one first washer and at least one second washer, said first washer being engaged with an outer periphery of said support portion of said at least one sun gear, whereby said first washer is capable of moving axially but incapable of rotation relative to said at least one sun gear, said second washer being engaged with an inner periphery of said receiving recess of said housing, whereby said second washer is capable of moving axially but incapable of rotations relative to said housing, said second washer is further interposed between said first washer and said step of said sun gear.

* * * * *